Patented Aug. 17, 1943

2,327,082

UNITED STATES PATENT OFFICE 2,327,082

POLYMERIZATION OF STYRENE

Joseph Frederic Walker, Lewiston, N. Y., assignor to E. I. du Pont de Nemours & Company, Wilmington, Del., a corporation of Delaware No Drawing. Application June 5, 1942, Serial No. 445,985

7 Claims. (Cl. 260—91)

The present invention relates to the polymerization of unsaturated compounds, particularly styrene. This application is a continuation-in-part of my co-pending application, Serial No. 361,113, filed October 14, 1940.

It is an object of the invention to provide an improved method of polymerizing styrene and the like compounds. A particular object is to provide a method of polymerizing such compounds by means of an alkali metal in the presence of certain solvents which facilitate polymerization. Further objects will be apparent from the ensuing description of the invention.

The above objects are accomplished in accordance with my invention by subjecting styrene and the like compounds to the action of an alkali metal in the presence of certain ether solvents. I have found that such solvents have a very specific effect in promoting the polymerization when an alkali metal is used as the polymerizing agent. Although the action of the solvents appears to be specific, I do not know whether their action is catalytic, whether the solvent itself takes part in the reaction in some manner, or whether there are some solubility or other physical factors involved. Regardless of the proper explanation as to the mode of action of the solvents, I have found that they very definitely promote the polymerization reaction and generally permit effecting the polymerization at relatively low temperatures. They also facilitate controlling the extent of polymerization.

Although the solvents which I have found to be suitable for the present purpose are all ethers, I have discovered that only certain types or classes of ethers are suitable. In general, three specific classes of ethers may be used in accordance with my invention. These classes of ethers are:

1. Saturated, aliphatic, acyclic monoethers having a $CH_3O$-group and having an oxygen to carbon ratio of not less than 1:4. Examples of such ethers are dimethyl ether, methyl ethyl ether, methyl propyl ether, and methyl isopropyl ether.
2. Saturated aliphatic, acyclic, polyethers having not more than one ether oxygen attached to any one carbon atom. Examples of this class of ethers are ethylene glycol dialkyl ethers, such as ethylene glycol dimethyl ether, ethylene glycol methyl ethyl ether, ethylene glycol methyl propyl ether, and the like. Other ethers of this class are glycerol trimethyl ether, glycerol methyl diethyl ether, glycerol triethyl ether and diethylene glycol dimethyl ether.
3. Certain dialkylamino ethers. I have discovered that certain dialkylamino derivatives of the ethers of the above classes 1 and 2 are effective solvent media for the present purposes. The dialkylamino ethers which promote the polymerizing action of alkali metals in accordance with the present invention are those in which the alkyl radicals in the dialkylamino group contain not more than three carbon atoms each, for example, the dimethyl-, diethyl-, methyl propyl-, and dipropylamino derivatives of the above ethers. The dialkylamino group may occupy any position in the ether molecule providing that there are not more than two carbon atoms between the amino nitrogen atom and the ether oxygen atom. In other words, the tertiary amino ether must contain the grouping

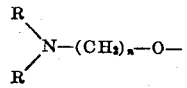

wherein R is an alkyl group containing not more than three carbon atoms and $n$ is the integer 1 or 2. Examples of such ethers are:

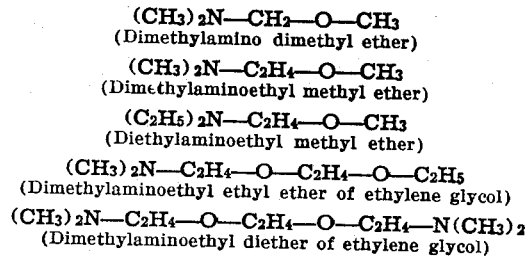

In addition to the above tertiary amino derivatives of the ethers of groups 1 and 2, I have found that certain tertiary amino derivatives of ethers not included in groups 1 and 2 have a promoting action upon the polymerization. Thus dialkylamino derivatives of diethyl ether and ethyl propyl ether, which derivatives include the tertiary amino group as defined in the foregoing paragraph, are effective. However, the parent ethers, i. e. diethyl ether and ethyl propyl ether, are ineffective for the present purpose. The rule stated previously that these amino ethers may not contain more than two carbon atoms between the nitrogen and oxygen atoms also holds for these ethers. Also, if the ether is a monoether it must not contain more than 7 carbon atoms, including the carbon atoms in the dialkylamino group. If the ether is a polyether, the ratio of the total carbon atoms to the sum of the ether oxygen atoms and amino nitrogen atoms present must not be greater than 5:1. A further requirement which must be met in order that a dialkyl amino ether may be useful for the present purpose is that any alkylene group present in the ether, which group is not attached to a nitrogen atom, must contain not more than three carbon atoms.

In general, the dialkylamino ethers which may be used in accordance with this invention may be defined as those saturated, aliphatic, tertiary-amino mono- and poly-ethers which contain at least one group represented by the formula

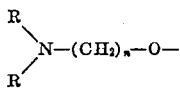

wherein R is an alkyl group having not more than three carbon atoms and $n$ is the integer 1 or 2, the monoethers included in the group being those which have not more than seven carbon atoms, and the polyethers being those in which the ratio of carbon atoms to the sum of the nitrogen and ether oxygen atoms present in the molecule is not greater than 5:1, any alkylene group present in such mono- or poly-ether, which group is not attached to a nitrogen atom, containing not more than three carbon atoms.

It should be understood that the ethers included within the above three groups as defined must not contain reactive groups, such as carboxyl, hydroxyl, or primary or secondary amino groups or the like, which react readily with alkali metals. In other words, the ethers should be substantially non-reactive towards alkali metals. By this I do not mean that the ethers may not react in some reversible manner with the alkali metal or with the compound being polymerized, since there are some indications that the above ethers may, to some extent, take part in the reaction. However, the ether must not be broken up or form irreversible reaction products to any appreciable extent. A slight irreversible action may take place without substantial loss of the ether or without substantially reducing the amount of alkali metal present in the reaction mixture. The ethers which are suitable within the scope of my invention are in effect "inert," although as noted they may play some active role in causing the reaction to proceed. In contrast to other ethers, such as ordinary diethyl ether, the present ethers may be termed "effective" ethers in that they definitely promote the polymerization reaction.

While I prefer to use the present "effective" ethers or mixtures thereof alone as reaction media, they may be diluted, if desired, with various ineffective materials, such as benzene, toluene, diethyl ether and the like, which materials do not react with alkali metals and are themselves not suitable for use alone as solvents in practicing the present invention. The effect of diluting the present ethers with materials such as benzene or diethyl ether is usually to decrease the rate of polymerization. In general, as the concentration of the ether is decreased, a minimum concentration is reached, below which the ether will have no practical promoting effect. This minimum concentration will vary for the various ethers and with reaction conditions such as temperature, concentration of styrene in the reaction medium, etc. Accordingly, the concentration of the effective ether in the reaction mixture should be sufficient to have a substantial promoting effect upon the polymerization reaction.

The above ethers are especially effective for promoting the polymerization of styrene by means of alkali metals. However, in place of styrene, various derivatives thereof may also be polymerized and such derivatives are to be considered as included within the scope of the invention along with styrene, provided such derivatives do not react with the alkali metal, or if such reaction does occur, the rate of reaction is substantially lower than the rate of polymerization. Thus halogen, cyanogen, and alkyl substituted derivatives of styrene may also be polymerized by the present method. Some such derivatives may react to some extent with the alkali metal although not sufficiently to prevent the alkali metal from exerting its polymerizing action. Derivatives containing carboxy, hydroxy, and ester substituent groups are definitely excluded from the group of compounds that may be successfully polymerized by the present method since compounds containing such groups react too readily with the alkali metal.

Although the unsaturated compounds which are polymerizable by the present method may be regarded as non-reactive towards the alkali metal, it is not meant that such a compound may not react to form some alkali metal addition compound which may promote polymerization. It is conceivable that some such addition product may be formed and may have as great or even a greater promoting reaction than the alkali metal itself. Regardless as to what may be the proper explanation of the manner in which polymerization occurs, I have found that the present method is especially effective for promoting the polymerization of styrene and the like compounds.

Mixtures of styrene and compounds such as butadiene, isoprene, dimethyl butadiene, 1,2-dihydrobenzene, and cyclopentadiene may also be polymerized successfully by the present method.

The invention is illustrated by the following example:

*Example*

Ten grams of styrene dissolved in 50 cc. of ethylene glycol dimethyl ether were agitated at 20–30° C. for three hours in the presence of 2.5 grams of sodium. Unused sodium was removed from the reaction mixture and any combined sodium in the mixture was converted to sodium hydroxide by addition of water. The hydroxide was converted to sodium bicarbonate by means of carbon dioxide and the mixture was then filtered and the filtrate heated to 110° C. at 5–10 mm. Hg to remove solvent and water. A viscous oily residue remained which set to a thermoplastic residue on cooling. The amount of resinous polymer corresponded to a yield of 74%.

While the above example illustrates the use of only ethylene glycol dimethyl ether as solvent, other ether solvents included in the classes of ethers defined hereinabove may be used successfully. Some of these ethers are more effective than others. Of the three classes of ethers indicated, the acyclic poly-ethers generally give the best results, although good results may be obtained with ether of the other two classes, particularly the acyclic monoethers such as dimethyl ether. The preferred solvents are the ethylene glycol dialkyl ethers, especially ethylene glycol dimethyl ether.

I have discovered that when using the present ether solvents, various factors may influence the degree to which polymerization occurs. Factors such as temperature, time of reaction, and concentration of the unsaturated compound in the reaction mixture have distinct effects upon the degree of polymerization. By suitably adjusting such factors, it is possible to control polymerization to a considerable extent.

In general, the degree of polymerization varies inversely with the temperature, a lower degree of polymerization resulting at high temperatures than at low temperatures. A longer reaction time will generally result in a more highly polymerized product while with a shorter reaction period, product of a lower degree of polymerization is produced. The concentration of styrene in the reaction mixture also has an influence on the degree of polymerization, since as a general rule, the lower the concentration of styrene the lower will be the molecular weight of the polymerization product.

A particular advantage resulting from the use of the present ethers is that the polymerization may be effected at low temperatures. Temperatures as low as about $-50°$ C. and up to as high as the boiling point of the solvent may be used. Temperatures in the neighborhood of 20–30° are preferred although the choice of temperature will be governed to a certain extent by the type of product desired as well as by the particular ether which is to be used as reaction medium.

The above example shows the use of sodium as polymerization agent. Other alkali metals such as potassium and lithium may also be used. However, sodium is preferred since it is more readily available and is cheaper than the other alkali metals.

The above example and specific embodiments of the invention are intended to be illustrative and it is to be understood that the invention is not to be restricted thereby except as indicated in the appended claims.

I claim:
1. The process comprising subjecting styrene to the polymerizing action of an alkali metal in the presence of an ether selected from the group consisting of: (a) saturated, aliphatic, acyclic polyethers having not more than one ether oxygen attached to any one carbon atom, and (b) saturated, aliphatic, tertiary amino mono- and polyethers containing at least one group represented by the formula

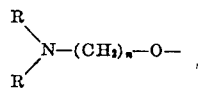

wherein R is an alkyl group having not more than 3 carbon atoms and $n$ is the integer 1 or 2 said tertiary amino monoethers having not more than 7 carbon atoms and said tertiary amino polyethers being those in which the ratio of carbon atoms to the sum of the nitrogen and ether oxygen atoms is not greater than 5:1, any alkylene group present in said tertiary amino mono- and polyethers, which group is not attached to a nitrogen atom, containing not more than 3 carbon atoms.

2. The process of claim 1 wherein the alkali metal employed is sodium.

3. The process comprising subjecting styrene to the polymerizing action of an alkali metal in the presence of a saturated, aliphatic, acyclic polyether having not more than one ether oxygen attached to any one carbon atom.

4. The process of claim 3 wherein the alkali metal employed is sodium.

5. The process of claim 3 wherein the ether employed is an ethylene glycol dialkyl ether.

6. The process comprising subjecting styrene to the polymerizing action of sodium in the presence of an ethylene glycol dialkyl ether.

7. The process of claim 6 wherein the ether employed is ethylene glycol dimethyl ether.

JOSEPH FREDERIC WALKER.